United States Patent [19]

Riddle

[11] Patent Number: 4,583,219

[45] Date of Patent: Apr. 15, 1986

[54] TRUNK FOR PACKET SWITCHING

[75] Inventor: Guy G. Riddle, Piscataway, N.J.

[73] Assignee: AT&T Bell Laboratories, Murray Hill, N.J.

[21] Appl. No.: 631,395

[22] Filed: Jul. 16, 1984

[51] Int. Cl.[4] .............................................. H04J 3/26
[52] U.S. Cl. ......................................... 370/60; 370/94
[58] Field of Search .................................... 370/60, 94

[56] References Cited

U.S. PATENT DOCUMENTS

| | | | |
|---|---|---|---|
| 4,317,195 | 2/1982 | Barberis et al. | 370/60 |
| 4,399,531 | 8/1983 | Grande et al. | 370/60 |
| 4,443,875 | 4/1984 | Blausten | 370/60 |
| 4,475,192 | 10/1984 | Fernow et al. | 370/60 |
| 4,484,326 | 11/1984 | Turner | 370/94 |
| 4,488,288 | 12/1984 | Turner | 370/60 |
| 4,499,576 | 2/1985 | Fraser | 370/94 |
| 4,516,238 | 5/1985 | Huang et al. | 370/60 |

OTHER PUBLICATIONS

"An Architecture for a Flexible Integrated Voice/Data Switch", *ICC '80 International Conference on Communications,* Seattle, WA, USA (8–12 Jun. 1980) pp. 21.6.1–21.6.5 by M. J. Ross, J. H. Gottschalck, and E. A. Harrington.

Primary Examiner—Douglas W. Olms
Assistant Examiner—Kenneth I. Rokoff
Attorney, Agent, or Firm—Patrick E. Roberts; Robert O. Nimtz

[57] ABSTRACT

Fair and fast service to a plurality of channels served by packet switches at nodes interconnected through a common carrier facility is achieved by controlling the quantity of data sent from any one channel to another. When data arrives at a node from a channel, the channel address is entered in line in the first of two channel address queues and the data is entered in a separate data queue. Each channel address is read from the first queue, a predetermined number of data bytes is read from the corresponding data queue and sent in a frame to a distant node. Thereafter, the channel address is entered at the end of the second, lower priority queue. The frame may have data bytes from other first queue channels but the frame length is limited either by a predetermined number of bytes or when no more channel addresses remain in the first queue. When no channel addresses remain in the first queue, a new frame is started by reading a channel address from the lower priority second queue. A frame may have data from a data queue corresponding to a channel address in the second queue followed by data from a data queue corresponding to a channel in the higher priority first queue.

15 Claims, 14 Drawing Figures

TRUNK FOR PACKET SWITCHING

TECHNICAL FIELD

This invention relates to packet switching and, in particular, to a trunk for effecting transmission of data between two packet switch nodes.

BACKGROUND OF THE INVENTION

Not too long ago, one who needed computing was required to send one's work to a central computer facility. With the advent of microprocessors, however, a user can communicate with a large computer using an intelligent terminal. At any time, there exist many such users who may be competing with one another to access the computer. Some of these users may take longer than others. Among the others, however, there may be some who need relatively shorter access times. The users are typically queued behind one another in their order of arrival. If a user needing a longer access time should be ahead of several needing relatively shorter access times, there latter users may have to wait a long time. This problem is known as delay or queuing. Many solutions have been proposed. An introduction to this may be found in a book entitled, COMPUTER NETWORKS by A. S. Tanenbaum, published in 1981 by Prentice-Hall, Inc.

Often, these users need to communicate with one another. A switch, located at a node, interconnects one user's terminal equipment with another user's terminal equipment. These terminals may be intelligent terminals, computers, or the like. A method for sending the information from one terminal to another is by way of packets. One system called DATAKIT VCS, a trademark of the AT&T Co. is disclosed in a paper by Mr. A. G. Fraser published by the International Conference on Communications, Boston, MA, 1979, volume 2, pages 20.1.1 to 20.1.3. A widely accepted specification for sending data in packets is found in a book published by the International Telecommunications Union, Geneva, 1977, entitled PUBLIC DATA NETWORKS, volume V111.2, authored by The International Telegraph and Telephone Committee (CCITT).

Sometimes, a user served by a first node may want to communicate with another user served by a second node. This second node is often located in the same business complex and connected with the first node by a light fibers. If, however, as is increasingly common, the second node is located at a distance from the first node, beyond the availability of light fibers, the two nodes can only be interconnected by currently available facilities. Generally available facilities in the United States can convey data only at a speed of fifty-six kilo bits a second.

It becomes apparent then that an algorithm is needed for sending data in packets between two terminals served by nodes separated by some distance using currently available slower facilities. Furthermore, this algorithm should insure that because slower facilities are used, no user should delay other users served by the same node.

SUMMARY OF THE INVENTION

In a data transmission system comprising a packet switch at each of two nodes interconnected by a transmission facility provided by a telecommunications common carrier, a trunk at each node provides fair and fast service for each user's equipment served by each node via a separate channel.

Two queues are provided for storing the addresses of the channels: a higher priority queue and a lower priority queue. Initially, each channel's address is entered at the end of the line in the higher priority queue, unless the channel's address is already entered in either of the queues in which case the channel's address is not entered again. A channel's address may be entered in either one or the other of the queues but never in both at the same time. The data associated with a channel will be entered in a separate data queue.

Data is transferred between nodes in frames. Each frame comprises chunks of data associated with one or more channels. Each chunk has its channel address and the number of bytes in the chuck. Each chunk comprises data bytes and control bytes. Control bytes are created and used by the nodes. Each control byte is associated with a special byte to distinguish control bytes from data bytes.

A frame is started by reading a channel's address from the higher priority queue and reading the corresponding data and control bytes from the data queue and forming a chunk. The chunk is limited in length. If data and control bytes remain in excess of this limit, the excess will remain in the data queue and the channel's address is entered at the end of the list of channel addresses in the lower priority second queue. This process is repeated until one of two tests is met: there are no more channel addresses in the first queue, or a predetermined number of bytes for the frame length is reached.

When there remains no more channel addresses in the first queue, the aforesaid process is repeated for the lower priority, second queue of channel addresses. The chunk length and frame length for data from the second queue, however, are longer. If the limit for a chunk length is reached and there remain data bytes, the remaining bytes are not read and the channel's address is entered at the end of the list of channel addresses in the second queue.

After each chunk is ended for a second queue, however, a check is made to see if a channel address is present in the first queue. If present, a chunk is formed for this channel. Thus, a chunk of data from the first queue may follow a chunk of data from the second queue. But a chunk of data from the second queue may never follow a chunk of data from the first queue in the same frame.

DETAILED DESCRIPTION

Figure 1:
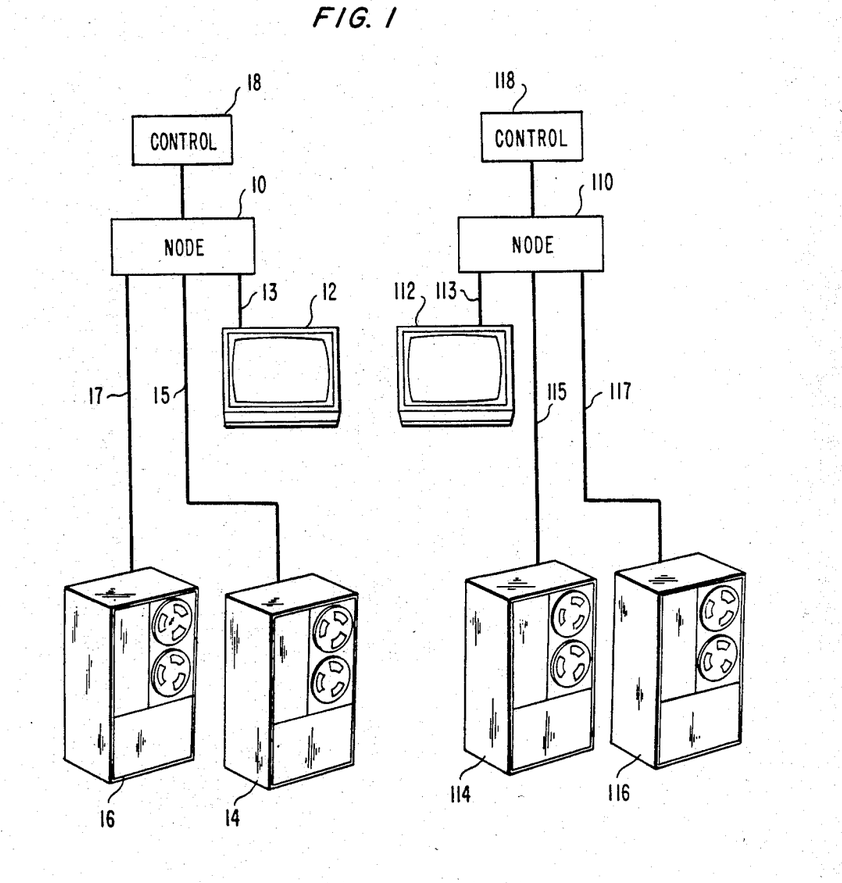
FIG. 1 shows a block diagram of a simple DATAKIT VCS system.

Referring to FIG. 1, there is shown a DATAKIT VCS (virtual circuit switch) network comprising two nodes 10 and 110. A plurality of computers and terminals 12, 14 . . . 16 are served by node 10 via channels 13, 15 . . . 17. Likewise, a plurality of computers and terminals 112, 114 . . . 116 are served by node 110 via channels 113, 115 . . . 117. At any time node 110 will be under control of either circuit 18 or 118 but not both. Likewise, node 10 may be under the control of either circuit 18 or 118 but not both at any time. The DATAKIT VCS network enables information to be transferred over the transmission facility 11 from a channel served by one node to a channel served by another.

Figure 2:
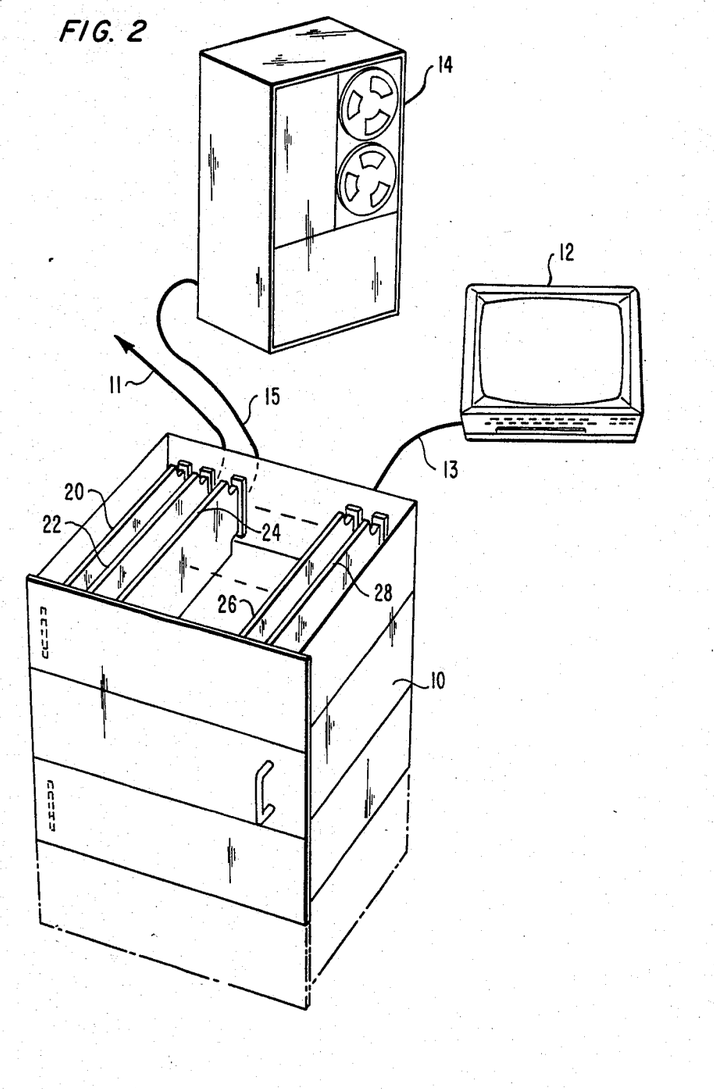
FIG. 2 shows an isometric view of a portion of the node of FIG. 1.

Referring to FIG. 2, there is shown a DATAKIT node 10 (or 110) comprising a backplane of the cabinet. These circuit boards interface with the user's equipment. Also shown are the channels 15, 13 which interconnect the interface modules at node 10 with the user's equipment: computer 14 and terminal 12. The cabinet is conveniently located at a customer's premises. Such a customer presumably has many user's.

Figure 3:
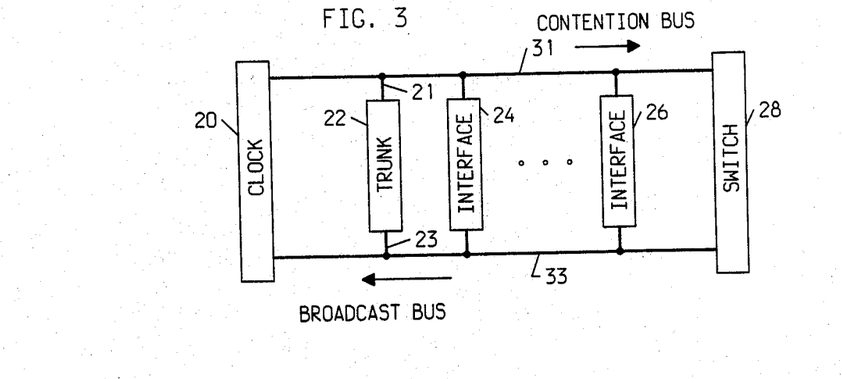
FIG. 3 shows a line drawing of the backplane of the cabinet of FIG. 2.

Referring to FIG. 3, there is shown a line drawing of a backplane, a common printed circuit board, of the DATAKIT node 10 or 110 shown in FIG. 2. Clock circuit 20 and switch 28, which are plug-in circuit boards are interconnected by a contention bus 31 and a broadcast bus 33. Each of a plurality of modules 22, 24 . . . 26 are shown connected between contention bus 31 and broadcast bus 33. Packets from the modules are sent over contention bus 31 to switch 28 from where the packets are returned over the braodcast bus 33 to the destination module, to be disclosed more fully hereinbelow.

Figure 4:
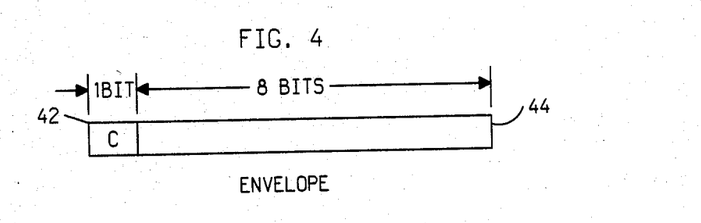
FIG. 4 shows the format of an envelope.

Information from each channel 13, 15 . . . 17 is transmitted in bytes, each having the usual format of eight bits, to the node 10. It is possible, however, for a customer to transmit information in envelopes, a format to be described hereinbelow, from equipment such as computer 15. Each byte of information from a channel arrives at its corresponding interface module 24 . . . 26. Referring to FIG. 4, there is shown the format of an envelope which is created at each interface module 22 . . . 24. The information byte 44 is prefixed with a control bit 42. If the control bit is a 1, the envelope contains information from a channel. If the control bit is a 0, the envelope contains control information from the interface module.

A parity bit 46 is also added by each interface module to the end of the envelope to create a parword. This is shown in FIG. 5.

Figure 6:
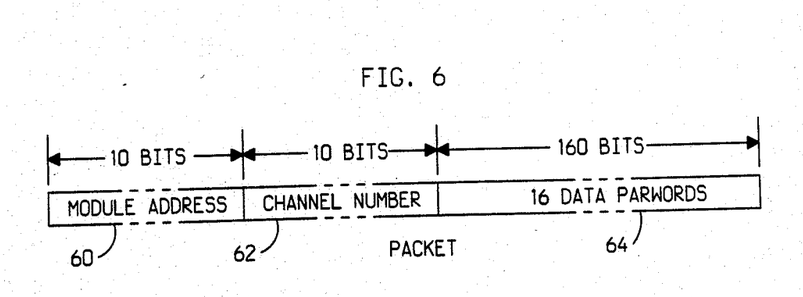
FIG. 6 shows the format of a packet.

As stated hereinabove, information is transferred from a module to the switch in packets. Referring to FIG. 6, there is shown the format of a packet. A packet comprises a module address 60, a channel number 62 and sixteen parwords 64. The module address 60 indicates the address of the module from which a packet originated. The channel number indicates the number of the channel from which the information in the packet originated. Referring to FIG. 3 again, a packet transferred over contention bus 31 to switch 28 has the addresses of the source module and the source channel. At switch 28 the addresses of the source module and the source channel are deleted and the addresses of the destination module and the destination channel are inserted therefor. This changed packet is then sent over the broadcast bus 33. Only the module which matches the destination address in the packet will process the packet. Thus, when information from node 10 is to be sent from a channel connected thereto to a channel connected to node 110, trunk module 22 will receive and process the packet received over broadcast bus 33 from switch 28.

Figure 7:
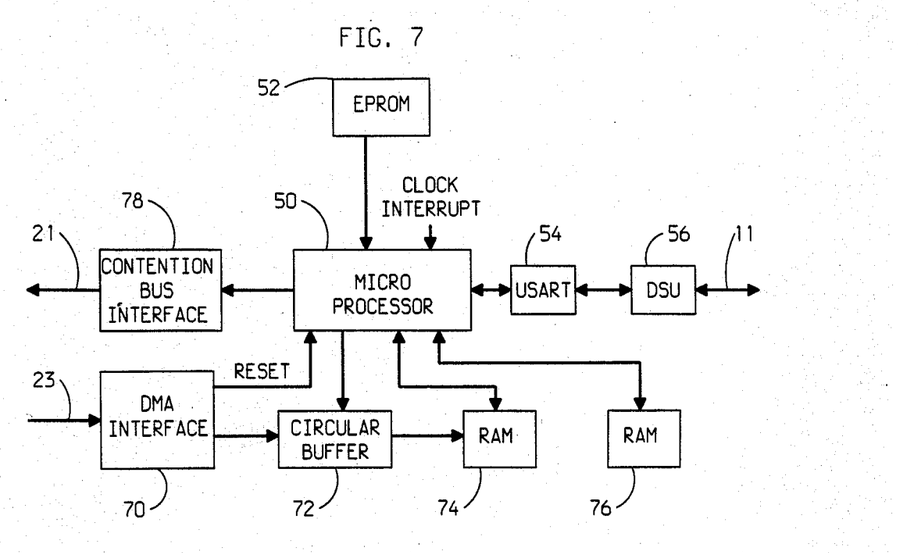
FIG. 7 shows in block diagram the layout of a trunk module.

Referring to FIG. 7, there is shown a block diagram of the trunk module 22 of FIG. 3. A packet received from switch 28 of FIG. 3 will be received on bus 23 which is connected with the broadcast bus 33, and entered via direct memory access (DMA) interface circuit 70 into circular buffer 72 which may be a random access memory. DMA interface circuits are well known for entering data into a memory device without interrupting a processor. Thus, DMA circuit 70 is used to enter packets into circular buffer 72 without interrupting processor 50. Because standard equipment is used, it is necessary to convert the nonstandard parwords in each packet into a format capable of being handled by standard equipment. Thus, each packet is disassembled at DMA circuit 70. The module address is discarded. Each remaining parword is packaged in halfwords, each having sixteen bits, beginning with the channel number, and transferred as halfwords to circular buffer 72.

Figure 5:
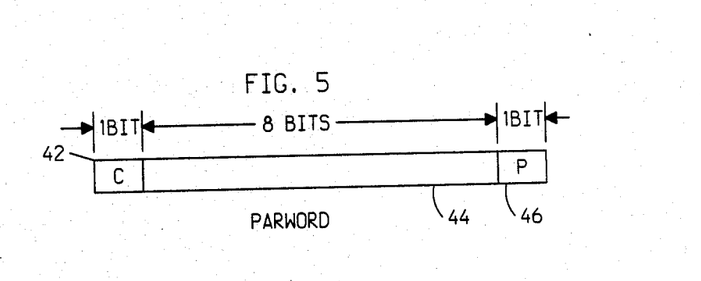
FIG. 5 shows the format of a parword.
Figure 8:
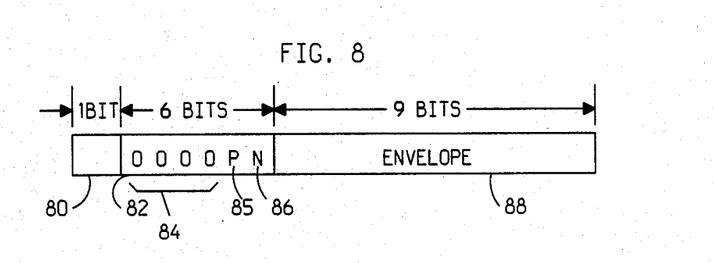
FIG. 8 shows the format of a halfword.

As stated earlier with reference to FIG. 5, a parword comprises a control bit, eight bits from a channel or the module indicating control, and a parity bit. Referring to FIG. 8, there is shown a halfword which is created by DMA circuit 70 for each parword. The halfword comprises sixteen bits in three sections 80, 82 and 88. Section 80 is not used in the present invention. Section 82 comprises six bits. Each of the first four bits is always set to 0. The fifth bit is the P parity bit 85. If the parword had incorrect parity, P is set to 1; if the parword had correct parity, P is set to 0. The sixth bit 86 is a 1 if the envelope 88 has a channel number; otherwise, it is 0. The third section 88 has an envelope. A program listing, entitled Interface, or the interface function is included in the appendix to this disclosure.

The function performed by the trunk comprises essentially three processes:
(1) emptying the circular buffer of halfwords and entering them into DATA QUEUES;
(2) selecting a DATA QUEUE to read bytes and transmitting bytes to the distant node; and
(3) receiving frames from the distant node and transmitting packets over the contention bus 31.

(1) EMPTYING THE CIRCULAR BUFFERS

Figure 9:
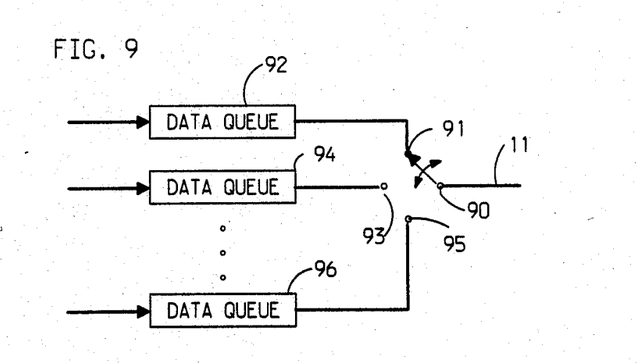
FIG. 9 illustrates how data is entered in data queues.

The function of the trunk module can be understood readily by referring both to FIGS. 7 and 9 simultaneously. The halfwords entered in circular buffer 72 are read under control of microprocessor 50 and entered as bytes in DATA QUEUES 92, 94 . . . 96 in RAM 74, to be described in detail hereinbelow. More particularly, the bytes corresponding to each channel are entered in a separate DATA QUEUE. It is a function of the trunk to read a predetermined number of bytes from each DATA QUEUE, shown schematically as a switch 90 which cycles through the DATA QUEUES by periodically making contact with the terminals 91, 93 . . . 95 but not necessarily in this fixed order.

Figure 10:
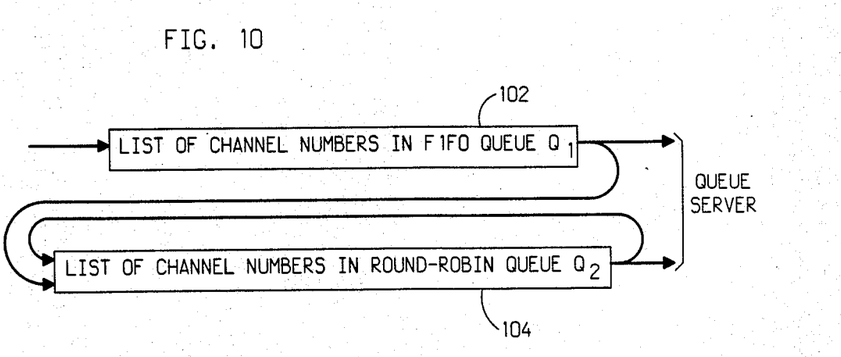
FIGS. 10, 11 and 12 illustrate the method by which each data queue of FIG. 9 is read.

Referring to FIG. 10, there is shown a first-in, first-out (FIFO) queue, Q1, 102 and a round-robin queue, Q2, 104. The channel numbers are entered in either queue 102 or queue 104, but not both, as the corresponding halfwords are read from circular buffer 72 and entered in RAM 74. These queues Q1 and Q2 are software queues and are located in RAM 76. If a channel number is not in either Q1 or Q2, when data for that channel is removed from circular buffer 72 then the channel number if entered in Q1. If a channel number is already entered in either Q1 or Q2, no further entry is made because the microprocessor merely causes the bytes to be added at the end of the corresponding DATA QUEUE. It is possible, therefore, for bytes from several packets of a channel to be entered in a DATA QUEUE provided the trunk has a large enough RAM. No record is kept of the original packet boundaries when multiple packets are placed in the same DATA QUEUE.

Initially, the programs to perform the trunk functions are transferred from erasable programmable read only memory (EPROM) 52 to RAM 76 under control of microprocessor 50. After all variables are initialized, normal trunk processing begins in which halfwords are read one at a time from circular buffer 72 corresponding to a channel for processing by microprocessor 50.

If the parity error bit 85, in the fifth position of section 82 of FIG. 8, is 0, the halfword is considered as having no errors. If the sixth bit position 86 in section 82 of FIG. 8 is a 1, the envelope in section 88 has a channel number. The channel number may be entered in Q1 as explained hereinabove. The halfwords following one having a channel number should have either user's information or DATAKIT control information. These envelopes will be converted into bytes according to a procedure explained in full below and entered into a DATA QUEUE associated with the channel number. Conversion of envelopes into bytes permit the use of standard equipment in implementing the present invention.

If the parity error bit is a 1, the envelope in the halfword has an error and should be discarded. If the error is found to be in a channel number, all envelopes in halfwords following the channel number will also be discarded until the next channel number is received. This is necessary because no channel number will be associated with these envelopes.

Envelopes are converted into bytes according to the following procedure. Control envelopes have a 0, in the first of the nine bits, preceding the control byte. Eight control bytes are reserved for trunk functions: bytes having the decimal value zero through seven. These envelopes need not be sent to the distant node and are discarded.

If the control byte does not have the decimal value zero through seven, then the leading 0 is converted to a STUF byte, 10011101, thereby creating two bytes: the STUF byte followed by the control byte. Both are stored in a DATA QUEUE.

All bytes received from a channel have a leading 1 in an envelope. If a non-control byte received from a channel has the format 10011101, this byte should be distinguished from the STUF byte. The leading 1 is deleted and the byte 00000000 is added behind the byte 10011101 to yield two bytes: 10011101 followed by 00000000 and both are stored are in that order.

All other envelopes having bytes received from channels will have the leading 1 deleted and only the remaining byte stored in RAM 74. As each envelope is read from buffer 72 for processing, the variable Queue Length for that channel is incremented by one. That is, the additional bytes used to distinguish channel bytes from control bytes will not be counted.

In order to provide fair service to all users, the queue length for each DATA QUEUE is limited to a maximum value, set at 1024 envelopes in the present embodiment. Any envelopes arriving for a channel having a queue length already at this limit are discarded and not placed in the DATA QUEUE.

As each channel number is entered in either Q1 or Q2, a variable QUEUED FLAG is set up for each channel. The variable QUEUED FLAG is true if a channel number is present in either Q1 or Q2. Oherwise it is false. The QUEUED FLAG is also true when bytes associated with that channel number are being sent to a distant node. A program entitled Gatherer which performs the aforesaid functions is included in the appendix of this application.

(2) SELECTION OF OUTPUT QUEUE FOR TRANSMISSION

A program entitled Transmitter is included in the appendix to this disclosure which is used in performing the trunk functions described in this section.

A subroutine Pick Channel is called. If there is any entry in Q1, the first entry in Q1 is read and entered in a variable entitled Trans Chan. This variable, Trans Chan, is located in RAM 76.

Another variable, From, can be set to be either Q1 or Q2 or neither Q1 nor Q2. This variable From is set to be Q1 for now. Otherwise, if Q1 is empty and Q2 is not empty, the first entry in Q2 is copied into the variable Trans Chan and From is set to Q2. If both Q1 and Q2 are empty, however, and a frame is currently being transmitted, the function End Frame is called, to end the frame which will be described below.

Assume a channel has been selected and an entry has been made in variable Trans Chan. If Queue Length for the channel number in Trans Chan is zero, the queued FLAG is changed to false and a new channel number is picked. The reason for this step will be explained more fully below. Immediately thereafter, a check is made to see if the variable From is Q2 and another variable Last From, comprising the previous entry in the variable From, is Q1. If this check is positive then the function End Frame is called to end the frame and give priority service to Q1. This is so because a frame is not permitted to have lower priority bytes from Q2 follow higher priority bytes from Q1.

If a frame is not being transmitted, however, the function Start Frame is called. Whether a frame is being transmitted or not is verified by checking a variable Now Transmitting to see whether it is true or false: true indicates that a frame is being transmitted and false that it is not.

Figure 13:
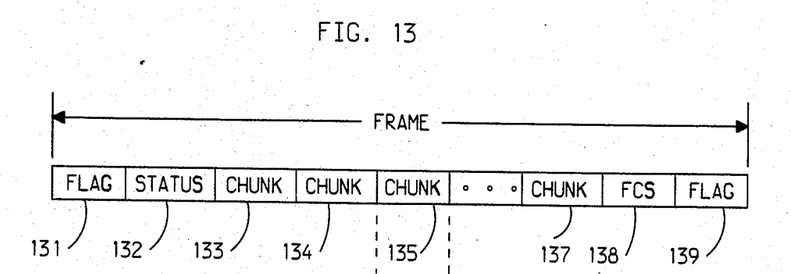
FIG. 13 shows the format of a frame.

Referring to FIG. 13, there is shown the format of a frame used for transmission of bytes from one node to another by the trunk described in the present invention. The frame is sent from left to right. A leading flag 131 comprising eight bits in the format 01111110 is sent first. Following flag 131 is sent a status byte 132 of eight bits. The status byte conveys information relating to the type of trunk in service. Following the status byte, one or more chunks 133, 134, 135 . . . 137 will be sent. A chunk comprises data from a single output queue and will be explained with reference to FIG. 14 hereinbelow. Following the chunks of data, a frame checking sequence (FCS) 138 will be sent. FCS 138 is a standard specified by X.25. a CCITT (The International Telegraph and Telephone Consultative Committee) standard. This standard may be found in a book entitled Public Data Networks, Volume VIII.2, and published by the International Telecommunications Union, Geneva 1977. The FCS 138 is used for detecting transmission errors. Following the FCS is sent a flag 139 having the format 01111110. Thus the flags 131 and 139 indicate the start and finish of a frame.

When the function Start Frame is called, microprocessor 50 initiates a frame sequence by sending a signal to USART 54 which sends a flag 131. It should be noted, however, that in the idle state, USART 54 is constantly sending flags to the distant node and, likewise, is receiving flags. By receiving a signal from microprocessor 50, however, USART 54 is informed that a frame will be started. Thus, immediately after the flag 131 is sent, the status byte 132 received from microprocessor 50 will be sent by USART 54 to the distant node. Immediately after the status byte is sent the variable Now Transmitting is set to true. The maximum frame size is set to 256. The Frame Length is initialized to one, counting the status byte. Thereafter, the function Start Chunk is called.

Figure 14:
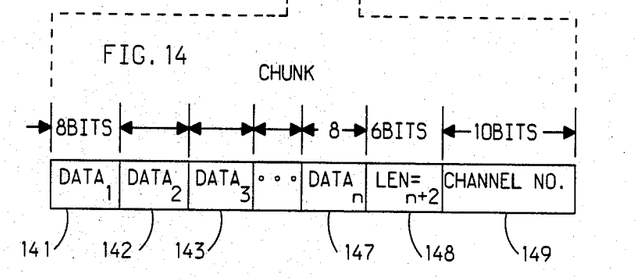
FIG. 14 shows the format of a chunk.

Referring to FIG. 14, there is a shown in block format a chunk. There are shown a plurality of eight bit data bytes 141, 142, 143 . . . 147 followed by a byte LEN 148 having six bits and a ten bit channel byte 149. Some envelopes discussed hereinabove are represented as two byte sequences, included among the data bytes 141 to 147. LEN 148 represents the Chunk Length in bytes. This LEN byte also includes the two bytes LEN and the Channel byte 149 in its count. The channel byte 149 comprising ten bits includes the channel number to which the chunk relates. The number of channels is a matter of design choice. In the preferred embodiment of the present invention, five hundred and twelve channels have been selected. Thus, because 2E10 yields 1024, ten bits provide 1024 channel numbers. The remaining 512 numbers provide for growth. In practice, however, when the bytes are transmitted from microprocessor 50 through USART 54, the six LEN bits along with the two most significant bits from the channel number are transmitted as a single byte. Bytes from only one channel is sent in a chunk.

The chunk is formed by the microprocessor 50 calling the function Start Chunk. A check is made to find the channel queue selected: Q1 or Q2. This information, Q1 or Q2, is stored in the variable From. If Q1 is selected, a variable entitled Max Chunk Length is set to sixteen. That means the number of bytes, excluding STUF bytes, LEN 148 and channel 149, permitted to be transmitted is limited to sixteen. The variable Max Frame Length is set to sixty-four, regardless of what was previously entered therein. That is, if the Max Frame Length was previously set to two hundred fifty-six, the variable is reset to sixty-four. If Q2 is selected, Max Chunk Length is set for forty-eight and Max Frame Length is allowed to remain at whatever it was.

In all cases the variables Chunk Length and Stuf Length are initialized, that is, set to zero. The variable Stuf Length is a count of the number of STUF bytes in a chunk. This terminates the function Start Chunk.

A loop is begun next for as long as the variable Queue Length for the channel in Trans Chan is greater than zero and a function More Chunk returns true.

The function More Chunk checks to see if the Chunk Length is less than the Max Chunk Length and if the Stuf Length is less than nine. If neither of these limits are exceeded, the function More Chunk returns true. Otherwise, the function returns false.

For as long as Queue Length exceeds zero and More Chunk returns true, the function Send Envelope is called. The Queue Length does not count STUF bytes in a DATA QUEUE.

When the function Send Envelope is invoked, the first byte is taken off the DATA QUEUE corresponding to the channel number in Trans Chan and entered in variable 'byte'. The contents of variable 'byte' are then sent ot USART 54, by calling the function Output, for transmission to the distant node.

The variables Chunk Length and Frame Length are next each incremented by one.

If the variable 'byte' is a STUF byte, then another byte is popped from the DATA QUEUE corresponding to the channel in Trans Chan and that byte is transmitted to the distant node. This is done so that the STUF byte always precedes the associated byte in the same chunk. Thereafter, the Stuf Length and the Frame Length are incremented by one.

In all cases, thereafter, the Queue Length corresponding to the channel in Trans Chan is decremeted by one. At this point, the loop is completed.

A check is done to see if the entry in either the variable From is Q1 or the variable Queue Length corresponding to the channel in variable Trans Chan is larger than zero. If either test is positive, the channel entered in variable Trans Chan is pushed to the end of the queue Q2. Otherwise, the queued FLAG for the channel in Trans Chan is set to false.

Figure 11:
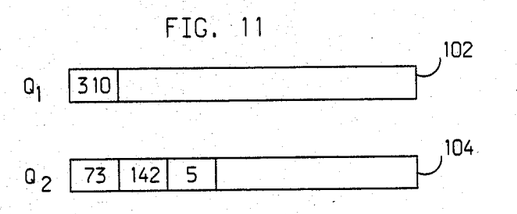
Figure 12:
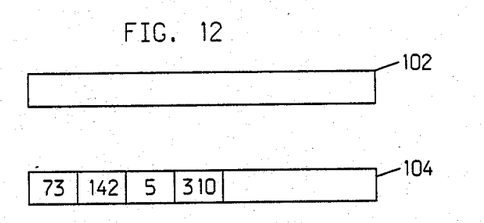

The aforesaid can be understood by referring to FIG. 11. There is shown a block 102 representing the queue Q1 and a block 104 representing the queue Q2. Shown in Q1 is the channel 310 and shown in Q2 are channels 73, 142 and 5 all awaiting to be served. Because Q1 has priority, channel 310 will be served first. If the number of envelopes to be sent from the data queue corresponding to channel 310 are less than or equal to sixteen they will be sent. The channel number 310 will be entered behind the last number 5 in Q2. Thereafter, as shown in FIG. 12, because no more channels remain in Q1 to be served, the first channel from Q2, that is 73 in this example, will be served. The channel number 310 will be entered behind the last number 5 in Q2.

If there existed more than the sixteen envelopes permitted for transmission from channel 310, a Q1 channel, the excess over sixteen will not be transmitted. In either case, the channel number 15 will be entered at the end of the queue in Q2. Thus, a short message such as acknowledgements, breaks, short interactive characters, and echo's being returned from a distant end, does not have to wait an inordinately long period behind another which may be a very long message.

The next function End Chunk is invoked to end a chunk. After the permitted number of bytes has been sent, the chunk trailer comprising sections 148 and 149 of FIG. 14 is sent. After these last two bytes have been sent, the variable Frame Length is incremented by two.

At this time, a test is done. If Frame Length is larger than Max Frame Length, then the function End Frame is called. The variable Last From is then set to the variable From. It is recalled that Last From is the previous value of From. That is, Last From indicates which channel the last chunk was associated with.

At this point, a channel is picked and the process recited hereinabove of forming and ending chunks is repeated.

The first task done by the next function, End Frame, is to send a signal from the microprocessor 50 to the USART 54 which causes the FCS 138 of FIG. 13 to be sent. Thereafter, the USART 54 sends a flag indicating the end of the frame.

Bytes from a channel may have the format 01111110 which is also the format of a flag which indicates the beginning or ending of a frame. In order to prevent user's bytes from being recognized as a flag, USART 54 inserts a 0 after sending five 1's in series. The bytes from USART 54 are then sent via a digital service unit (DSU) 56, an interface circuit between the aforesaid trunk and the telecommunication facitlity, for transmission over facility 11 to the Distant node. DSU 56 is designed according to the CCITT standard V.35, set forth in volume V111.1, Orange service, referenced hereinabove. The variable Now Transmitting is set to false, thereby indicating that data is not being transmitted. The variables From and Last From are set to zero.

(3) RECEIVING INFORMATION FROM A DISTANT NODE

A program, entitled Receiver, for performing the functions described in this section is included in the appendix to this disclosure.

The USART 54 has a small buffer for storing a few bytes received from the distant node. USART 54 interrupts microprocessor 50 which then reads one byte by calling the function Input. A fuction Read Frame is called by microprocessor 50 to read the bytes being received.

A loop is started, by reading a byte from the frame. If the variable Frame Buffer is full, that is, if the index is equal to the buffer capacity, the buffer contents are discarded. If the Frame Buffer is not full, the byte read is entered into the Frame Buffer.

When characters run out, USART 54 status registers are checked. As information is received from the distant node, USART 54 checks the received data, computes an FCS, and after a trailing flag is received compares the computed FCS with the received FCS at the end of the frame to determine if the received data is good or bad in accordance with the standard set out in X.25, stated hereinabove. The results of this check are relayed by the status registers (not shown) in USART 54 to microprocessor 50.

After microprocessor 50 determines from the status registers in USART 54 that the FCS check is positive, it will continue by introducing the frame received over the contention bus 31, by calling the function Peel Chunk. The status byte of the incoming frame is checked, and if incompatible with the format known to the receiving module, the frame is discarded. The function Peel Chunk starts from the end of the frame buffer and recursively computes the length 148 and channel number 149 for each chunk until the beginning of the frame buffer is reached. Then, starting with the first chunk in the frame buffer the bytes in that chunk are processed as described below.

A byte is next read from the chunk previously stored in RAM 76. If the byte read is not a STUF byte, it is construed to be a user's byte. A '1' is prefixed to the byte and then transmitted as an envelope to the FIFO in circuit 78 by calling the function Distribute.

If the byte retrieved from the RAM 76 has the format 10011101, the next byte is read. If this next byte read has the format 00000000, the first byte read is interpreted to be a user's byte. The byte 00000000 is deleted and a '1' is prefixed to the byte and transmitted as the envelope 110011101.

If the byte read has the format 100111101, a STUF byte, and the next byte retrieved from RAM 76 does not have the format 00000000, the STUF byte is deleted and the trailing byte is prefixed with a '0' and sent to the FIFO in circuit 78 as an envelope by the function Distribute.

After a desired fraction, currently sixteen envelopes, or sometimes all of a chunk has been sent to the FIFO in circuit 78, a signal is transmitted from microprocessor 50 to the DATAKIT interface circuit 78 indicating that the packet should be assembled and sent over bus 21 to switch 40 of FIG. 3. The DATAKIT interface circuit 78 forms a source module address that is, the trunk module address, the source channel number, and remaining parwords, inserting a parity bit in each parword. Bad data is deleted by switch 40.

Thereafter, if a fraction of a chunk remains, microprocessor 50 repeats the aforesaid process until the entire chunk is sent to the destination terminal.

As stated hereinabove, the source module address is deleted at switch 40 and the destination address inserted therefor. The packet is thereafter sent over broadcast bus 33. The interface module matching the destination module address processes the packet by deleting the destination module address. Control envelopes are retained for use in the module. The remaining envelopes are converted into bytes by deleting the control bit and the bytes are transmitted over the channels to the user's equipment. If a customer so desires, information may be transmitted to the customer's equipment, such as computer, directly as envelopes.

Although the transmitter and receiver have been implemented on a single processor, it is a simple matter to make the two operate independently by using separate processors.

What is claimed is:

1. A method for controlling the quantity of information comprising a plurality of data bytes to be transferred from each of a plurality of channels served by one node to channels served by another node, each of said channels at each of said nodes having an address, said method comprising the steps of disassembling the information received at a node, entering the address of each of said channels demanding service in the order of the arrival of said information in a first queue, and storing said information corresponding to each of said channels in a separate data queue.

2. The method of claim 1 further comprising the steps of reading a first address of said channels from said first queue, and reading said data bytes, one byte at a time, from a data queue corresponding to said first address of said channels.

3. The method of claim 2 further comprising the steps of starting the formation of a frame for transmitting said information from said one node to said another node, and starting the formation of a plurality of chunks, one at a time, for transmitting said data bytes corresponding to each address of said channels in a separate chunk, each of said chunks including, at determinable events, control bytes to effect control of said nodes, said control bytes being distinguished from said information bytes by including a special byte adjacent to said control byte.

4. The method of claim 3 further comprising the steps of
   limiting the length of a chunk according to a predetermined first limit said first limit comprising a plurality of said data and said control bytes, said chunk including an address of one of said channels and the number of bytes in said chunk, and further limiting the length of said chunk by a second limit said second limit comprising a predetermined number of said special bytes, and
   ending said chunk when either all of said data bytes corresponding to said address of said channel has been read from said data queue or one of said first or second limits has been reached.

5. The method of claim 4 further comprising the steps of
   limiting the length of a frame according to a predetermined third limit, said third limit being a predetermined number of said data, said control bytes and a plurality of overhead bytes comprising the length of the chunk and the channel number, and
   ending said frame when said third limit is reached or when all queues are empty.

6. The method of claim 5 further comprising the step of
   entering said address of said channel at the end of the line in a lower priority, second queue, either after said first limit or said second limit is reached or after all of said data bytes have been read from said data queue.

7. The method of claim 6 further comprising the steps of
   reading an address of one of said channels from said second queue when no addresses of said channels remain in said first queue, and
   reading one data byte at a time corresponding to said address of said channel from said data queue.

8. The method of claim 7 further comprising the steps of
   starting the formation of a frame for transmitting said information from said one node to said another node,
   starting the formation of a chunk of said data bytes corresponding to said address of said channel read from said second queue, the length of said chunk being determined by a fourth limit of said control bytes and said data bytes, or by said second limit of special bytes, each of said chunks including said address of said channel and the number of said data bytes and said control bytes in said chunk,
   entering said address of said channel being served, when there remain data bytes at the end of all other channel numbers in said second queue, and
   ending said chunk when said fourth limit has been reached or when there remain no further data bytes in said data queue.

9. The method of claim 8 further comprising the step of
   ending said frame when a fifth limit comprising a predetermined number of said control bytes and said data bytes has been reached or when no further addresses remain in either said first or second queues.

10. The method of claim 9 further comprising the step of
    limiting said information corresponding to each of said channels which may be stored in said data queues.

11. A method for transmitting information from one location to another location, each of said locations serving a plurality of users' equipment, each of said equipment having an address, said method comprising the steps of
    disassembling the information received from said equipment and
    storing said information as bytes from each of said equipment in a separate data queue,
    storing the address of said equipment in a separate first channel queue,
    reading an address from said first queue,
    reading a predetermined plurality of said information bytes from the data queue corresponding to the address read from said first queue,
    sending said information bytes in a frame from said one location to said other location, and
    entering said address at the end of said first queue.

12. The method of claim 11 further comprising the step of
    forming said frame by including a plurality of chunks, each of said chunks comprising a plurality of said information bytes and a plurality of control bytes to effect control functions at said locations, said control bytes being distinguished from said information bytes by preceding each of said control bytes with a special byte, each of said chunks further comprising the address of said equipment associated with said bytes and the length of the chunk in bytes.

13. A method for transmitting packets between two packet switch nodes over a telecommunications common carrier facility, each of said nodes serving a plurality of users' equipment over separate channels and each of said nodes being served by a trunk, said method comprising the steps of
    receiving said packets from one of said nodes and disassembling each of said packets into a plurality of data bytes and a channel address byte,
    storing said channel address byte in a higher priority, first queue and storing said data bytes in a data queue,
    reading a channel address byte from said first queue, reading a predetermined plurality of data bytes from said data queues, and entering said channel byte at the end of the line in lower priority, second queue,
    forming a frame comprising a plurality of chunks, each of said chunks comprising a predetermined number of said bytes, and
    transmitting said frame from said trunk to a distant node.

14. The method of claim 13 wherein said chunk is formed by placing the length of said chunk at the end of said chunk.

15. The method of claim 13 further comprising the steps of
    receiving said frame at a trunk at said distant node,
    disassembling said frame and said chunks into a plurality of data bytes,
    forming packets of said data bytes, and
    sending said packets to a destination channel.

* * * * *